United States Patent [19]
Yokota

[11] Patent Number: 6,006,804
[45] Date of Patent: Dec. 28, 1999

[54] PNEUMATIC RADIAL TIRE INCLUDING VIBRATION BUFFER WALL

[75] Inventor: Hidetoshi Yokota, Tokyo, Japan

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/792,052

[22] Filed: Feb. 3, 1997

[30] Foreign Application Priority Data

| Feb. 2, 1996 | [JP] | Japan | 8-017725 |
| Mar. 4, 1996 | [JP] | Japan | 8-046228 |
| Jul. 22, 1996 | [JP] | Japan | 8-192395 |
| Jan. 10, 1997 | [JP] | Japan | 9-003217 |

[51] Int. Cl.⁶ .......................... B60C 11/04; B60C 11/13; B60C 101/00; B60C 105/00
[52] U.S. Cl. .................. 152/209.19; 152/209.23; 152/209.27; 152/901
[58] Field of Search .................. 152/209 R, 209 D, 152/209.19, 209.21, 209.23, 209.27, 901

[56] References Cited

U.S. PATENT DOCUMENTS

| 2,121,871 | 6/1938 | Havens | 152/209 R |
| 2,197,662 | 4/1940 | Hughes | 152/209 R |
| 2,290,625 | 7/1942 | Stein | 152/209 R |
| 3,586,086 | 6/1971 | Boileau | 152/209 R |
| 3,763,911 | 10/1973 | Montagne | 152/209 R |
| 4,936,363 | 6/1990 | Schuster et al. | |
| 5,131,444 | 7/1992 | Kukimoto et al. | 152/209 R |
| 5,323,825 | 6/1994 | Yamagishi et al. | 152/209 R |
| 5,345,988 | 9/1994 | Kabe et al. | 152/209 |
| 5,375,639 | 12/1994 | Suzuki et al. | 152/209 R |

FOREIGN PATENT DOCUMENTS

| 0 313 361 | 4/1989 | European Pat. Off. . | |
| 0 356 369 | 2/1990 | European Pat. Off. . | |
| 0 648 622 | 4/1995 | European Pat. Off. . | |
| 659594 | 6/1995 | European Pat. Off. | 152/209 R |
| 2119263 | 4/1972 | France . | |
| 28 16 626 | 10/1978 | Germany . | |
| 2-179508 | 7/1990 | Japan | 152/209 R |
| 2-189204 | 7/1990 | Japan | 152/209 D |
| 3-38412 | 2/1991 | Japan . | |
| 4-15108 | 1/1992 | Japan | 152/209 R |
| 4-43104 | 2/1992 | Japan | 152/209 R |
| 4-334606 | 11/1992 | Japan | 152/209 R |
| 6-115318 | 4/1994 | Japan | 152/209 R |
| 7-117414 | 5/1995 | Japan . | |
| 1 549 347 | 8/1979 | United Kingdom | 152/209 R |

*Primary Examiner*—Steven D. Maki
*Attorney, Agent, or Firm*—Sughrue, Mion, Zinn, Macpeak & Seas, PLLC

[57] ABSTRACT

A pneumatic radial tire which is excellent in drainage and capable of reducing air-column-tube resonance sounds in circumferentially extending grooves to decrease noises. The pneumatic radial tire comprises a tread provided thereon with a groove extending circumferentially in the circumferential direction of the tire and a vibration buffer wall having essentially an identical cross-sectional shape provided near the sidewall of said circumferentially extending groove, wherein the height of the outside edge of the vibration buffer wall in the radial direction of the tire is lower than the height of the outside edge of the circumferentially extending groove in the radial direction of the tire.

15 Claims, 14 Drawing Sheets

Vibration Spectrum

In the range of 2 kHz to 3.2 kHz

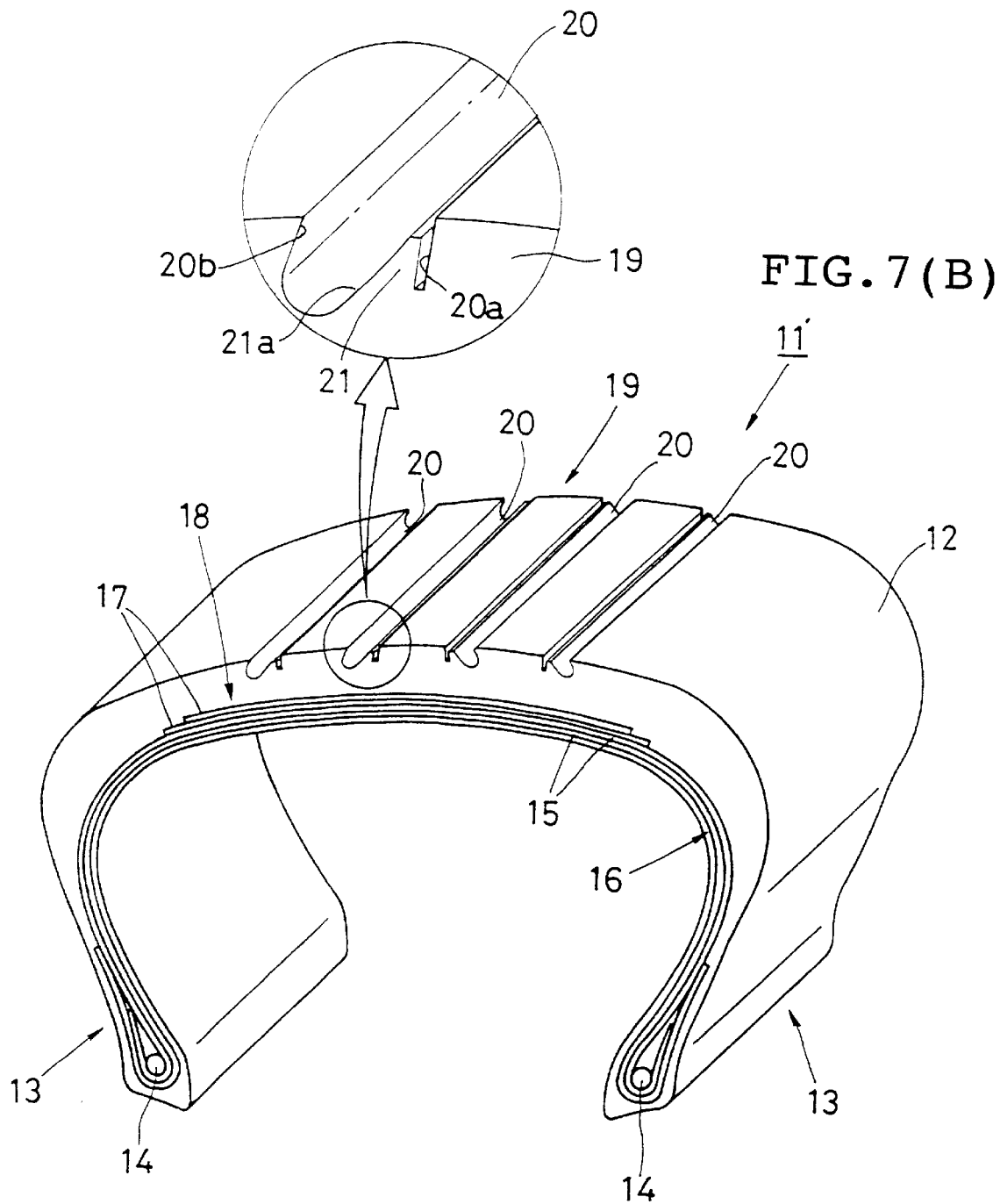

Measurement Result of Vibration of Groove Wall

PNEUMATIC RADIAL TIRE INCLUDING VIBRATION BUFFER WALL

BACKGROUND OF THE INVENTION

1. Field of Invention

The present invention relates to a pneumatic radial tire. More particularly, it relates to a pneumatic radial tire having improved drainage with low noise for use in high-speed large trucks or automobiles.

2. Description of the Prior Art

In automobiles running at high speed on rainy days, rainwater penetrates and is wedged between the tread of a tire and the surface of a road to cause a phenomenon called hydroplaning in which the friction between the tread and the road surface is lost and the steering wheels and brakes do not correctly function. Thus safety of driving is compromised.

Conventionally, the pneumatic radial tire 1 as shown in FIG. 15 is proposed to solve the problem of hydroplaning in automobiles. This pneumatic radial tire 1 is formed as a toroid with rubber layer 2, and the beads 3 which are provided with a pair of bead cores 4 formed into a ring around the rotating shaft of the radial tire 1. A 2-ply carcass layer 6, consisting of radial ply cords 5 arranged with the ends of the carcass layer 6 turned inside to outside as they are wound around a pair of bead cores 4.

The radial outside of carcass layer 6 is provided with a 2-ply steel belt layer 8 consisting of substantially nonstretchable steel cord 7, and radially outside of the steel belt layer 8, a tread 9 is formed to cover the steel belt layer 8. Further, the surface of the tread 9 is provided at predetermined intervals with a plurality of continuous rib grooves circumferentially extending around the radial tire 1 to permit water entrapped between the tread 9 and the surface of a road to be discharged outside via the circumferentially extending grooves 10, thus improving the drainage of the radial tire 1.

In the radial tire 1 as proposed above, however, there occur air-column tubes between the circumferentially extending grooves 10 and the surface of a road in the rolling tire, and the air in the air-column tubes causes noise by resonating with the vibration of the radial tire 1 brought about by the uneven surface of a road. If circumferential grooves 10 are enlarged to secure drainage, the noise will increase because the air-column-tube resonance sounds are raised generally in proportion to the size of circumferential groove 10.

As a technique to solve the problem, there is proposed, for example, a pneumatic tire having a tread provided with circumferentially extending grooves and in the crosswise direction of the tire with laterally extending grooves with an incline to the equatorial plane of the tire, where notches are formed roughly parallel to and adjacent to the laterally extending grooves. (Japanese Patent Application Laid-Open Publication No. 38412/1991).

However, such a pneumatic tire is not effective enough for preventing noise because both the laterally extending grooves and the notches come into contact with the ground and the sidewalls of both the laterally extending grooves and the notches are simultaneously vibrated. That is, the pneumatic tire disclosed in Japanese Patent Application Laid-Open Publication No 38412/1991 has not succeeded in solving the above problem and the problem to be solved remains.

A pneumatic radial tire in which the upper edges of the sidewalls of a circumferentially extending groove are made with slopes with an incline to the equatorial plane of the tire is also proposed in e.g., Japanese Patent Application Laid-Open Publication No. 117414/1995. However, this prior art pneumatic radial tire cannot relieve lateral vibration of its circumferentially extending grooves and thus cannot satisfactorily reduce air-column-tube resonance sounds. Hence, the pneumatic tire disclosed in Japanese Patent Application Laid-Open Publication No. 117414/1995 has not succeeded in solving the above problem.

There is further proposed a pneumatic radial tire having a tread provided with a rib and with a circumferentially extending wide groove, said rib having circumferentially extending thin grooves formed outside said circumferentially extending wide groove, wherein the edge zone between the circumferentially extending wide and thin grooves is lower than the rib (U.S. Pat. No. 4,936,363).

However, the pneumatic radial tire proposed in U.S. Pat. No. 4,936,363 was structured as above to prevent the edge of the rib from undergoing wear, and said lower edge zone has projecting and reentrance portions on the sidewalls the circumferentially extending wide groove, that is, the cross-sectional shape of the edge zone is uneven, while the outside surface also has projecting and reentrance portions. Therefore, this prior art tire may be effective for preventing wear on the rib, but can not relieve the vibration in the crosswise direction of the circumferentially extending groove of the rolling tire. Therefore, this tire has not attained sufficient prevention of noise resulting from air-column-tube resonance sounds.

SUMMARY OF THE INVENTION

The present invention was made in view of the above problems and an object is to provide a pneumatic radial tire having excellent drainage properties but at the same time is capable of reducing noise by decreasing air-column-tube resonance sounds.

To solve the problem, the pneumatic radial tire of the present invention comprises a loop-shaped carcass layer provided across a pair of bead cores, a belt layer and a tread arranged in this order on the outside of said carcass layer in the radial direction, and circumferentially extending grooves provided on the surface of said tread, wherein vibration buffer walls with a roughly identical cross-sectional shape are formed adjacent to the sidewalls of the circumferentially extending groove, and the height of the outside edge of said vibration buffer wall in the radial direction of the tire is made lower than the height of the outside edge of said circumferentially extending groove in the radial direction of the tire.

BRIEF DESCRIPTION OF THE DRAWINGS

FIGS. 7(A) and 7(B) are an enlarged sectional perspective view and an overall perspective view of a third example of the pneumatic radial tire of the present invention.

FIG, 14 illustrates a characteristic vibration level against frequency, of rib grooves in rolling tires.

Figure 15:
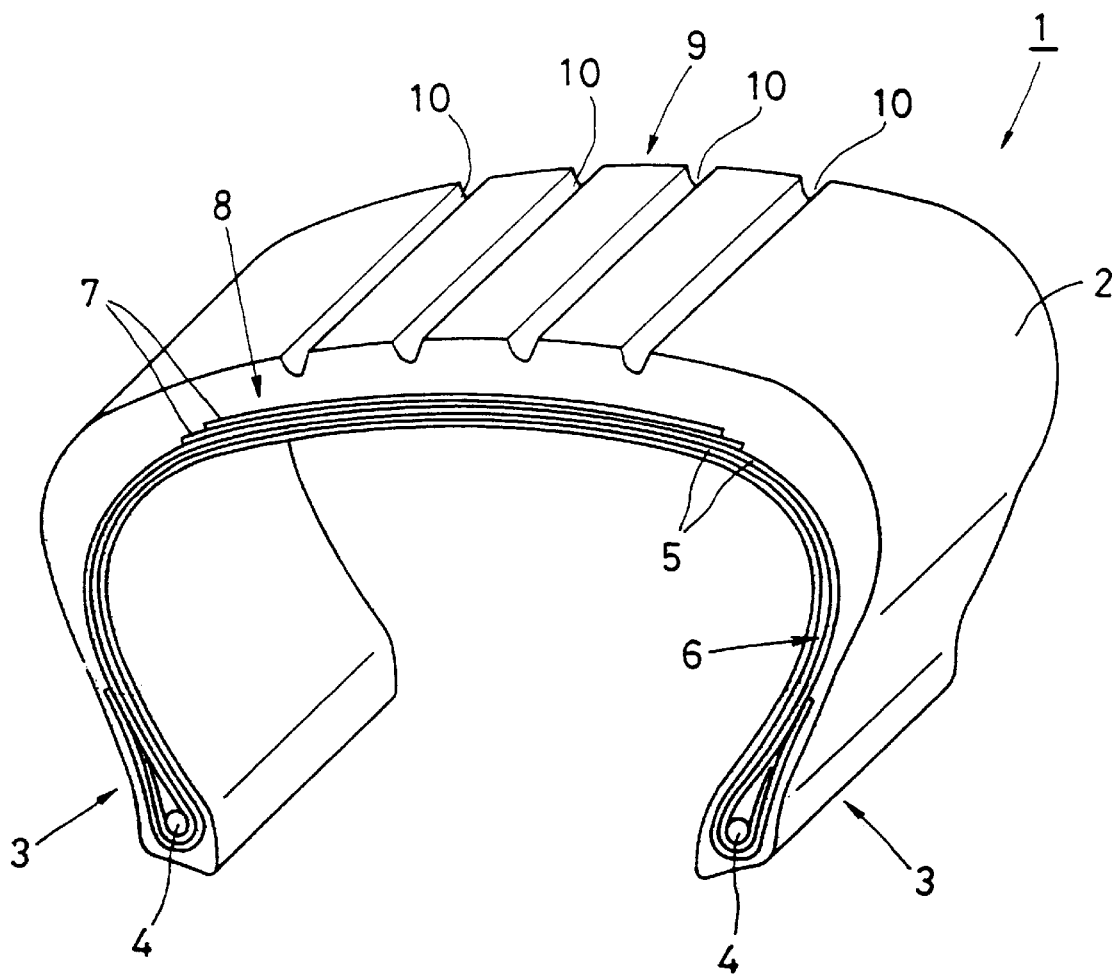

FIG. 15 is a sectional perspective view of a prior art pneumatic radial tire.

In the drawings, the following are used to designate common items, 11, 11' are pneumatic radial tires; 12, rubber layer; 13, bead; 14, bead core; 15, ply cord; 16, carcass layer); 17, steel cord; 18, steel belt layer; 19, tread; 20, rib groove; 20a, 20b, 21c, sidewalls; and 21, vibration buffer wall.

DESCRIPTION OF THE PREFERRED EMBODIMENT

In a specific embodiment of the pneumatic radial tire of the present invention, vibration buffer walls are formed roughly parallel to and adjacent to the sidewalls of the circumferentially extending groove, and the vibration buffer walls have notches.

In another embodiment, the vibration buffer walls are formed adjacent to one of the sidewalls of the circumferentially extending groove, and another sidewall of the circumferentially extending groove is inclined at an acute angle to the tread face, at an angle of 20° to 45° to a normal line perpendicular to the tread face, and the sidewall of the vibration buffer wall at the side of the circumferentially extending groove is inclined in the same direction as another sidewall and at an angle of 20° to 45° to a normal line perpendicular to the tread face. If necessary, the upper edge of another sidewall of said circumferentially extending groove is chamfered.

Another embodiment of the pneumatic radial tire of the present invention is characterized by having the following relationships (1) to (4):

$$0.50D \leq H \leq 0.95D \quad (1)$$

$$S \leq 0.30B \quad (2)$$

$$0.01B \leq W \leq 0.30B \quad (3)$$

$$0.50D \leq L \leq 1.50D \quad (4)$$

wherein, B is the width of the circumferentially extending groove, D is the depth of the circumferentially extending groove, H is the height of the buffer vibration wall from the bottom of the circumferentially extending groove, S is the width of the upper surface of the buffer vibration wall, W is the width of a groove between the sidewall of the circumferentially extending groove and the vibration buffer wall, and L is the depth of the groove between the circumferentially extending groove and the vibration buffer wall.

By forming the vibration buffer walls with roughly identical cross-sectional shapes adjacent to the sidewalls of the circumferentially extending groove, the pneumatic radial tire of the present invention suppresses transmission of tread vibration from the circumferentially extending grooves in the rolling tire to the air in the circumferentially extending grooves. As a result, the air-column-tube resonance in the circumferentially extending grooves is suppressed and the generation of noise is thus prevented. That is, the shear strength in the crosswise direction of the circumferentially extending grooves in the rolling tire is reduced, the vibration in the crosswise direction of the circumferentially extending grooves is relieved, and air-column-tube resonance sounds at high frequency of 1.6 KHz or greater is also reduced.

By arranging the vibration buffer walls essentially parallel to the sidewalls of said circumferentially extending groove, the capacity of the circumferentially extending grooves is secured thus permitting the circumferentially extending grooves to accommodate a sufficient amount of water to ensure drainage.

By making the height of the outside edge of the vibration buffer wall lower than the height of the outside edge of the circumferentially extending groove, the vibration buffer wall receives relatively low pressure from the ground as compared with other portions of the tire. Therefore, the vibration buffer wall itself does not vibrate in such a high level as in other portions and thus it does not cause the vibration of the air in the circumferentially extending grooves. The generation of noises is thereby effectively prevented. Further, when a portion or the entire of the outer edge (surface of the tread) of the circumferentially extending groove has the same height as the outer edge of the vibration buffer wall as a result of the spread of wear on the tread, the outer edge of the vibration buffer wall will undergo greater wear than the outer edge of the circumferentially extending grooves because the rigidity of the outer edge of the vibration buffer wall is lower than that of the outer edge of the circumferentially extending groove. Therefore, the height of the outer side edge of the vibration buffer wall is maintained always lower than the height of the outer edge of the circumferentially extending groove. Furthermore, the production of tires is facilitated by the presence of notches in the vibration buffer walls.

By allowing another sidewall of the circumferentially extending groove to be inclined at an acute angle to the tread face, that is, at an angle of 20° to 45° to a normal line perpendicular to the tread face, the compressive rigidity of the tread in the rolling tire is lowered and vibration occurring on an uneven road is relieved. The vibration at the bottom of the circumferentially extending groove is thereby relieved, and reduction of the level of air-column-tube resonance sounds of about 800 Hz results.

This reduction is attained because among the air-column-tube resonance sounds in the circumferentially extending groove, sounds of about 800 Hz occur due to the vibration of the bottom of the groove in the direction of a normal line perpendicular to the tread face, while high-frequency sounds of 1.6 KHz or to the vibration in the crosswise direction of the groove wall. The inclination of another sidewall of the circumferentially extending groove to a normal line perpendicular to the tread face is limited to an angle of 20° to 45° because at a degree of less than 20° it is hard to change compressive rigidity. At an angle of 45° or more, the strength and durability of the upper edge of the tread because weak and its manufacturing is also problematic because it is hard to release it from a mold after vulcanization. The angle of inclination of the sidewall, at the side of the circumferentially extending wall, of the vibration buffer wall is preferably set at an angle of 20° to 45° for manufacturing.

The vibration buffer wall with a sidewall inclining at the side of the circumferentially extending groove will not touch the ground because the height of the outside edge of the vibration buffer wall is made lower than the height of the outside edge (surface of the tread) of the circumferentially extending grooves. Thus, the shear strength of the circumferentially extending groove in the crosswise direction is lowered in the tire on the ground, and the vibration of the circumferentially extending groove in the crosswise direction is suppressed. In this case, the height of the vibration buffer wall is made about 0.8-times the depth of the circumferentially extending groove. This is because the effect the vibration buffer wall is decreased if the vibration buffer wall is too low. If it is too high, it will receive vibration upon contact of the rolling tire with the ground to increase air-column-tube resonance sounds.

In addition, the sidewall of the circumferentially extending groove, which inclines at an acute angle, is chamfered at its upper end whereby durability of the sidewall is improved and its manufacturing is made easy.

The embodiments of the present invention are further described by reference to the drawings. Those elements which have the same function have the same symbols in the following description of the embodiments.

Figure 2:
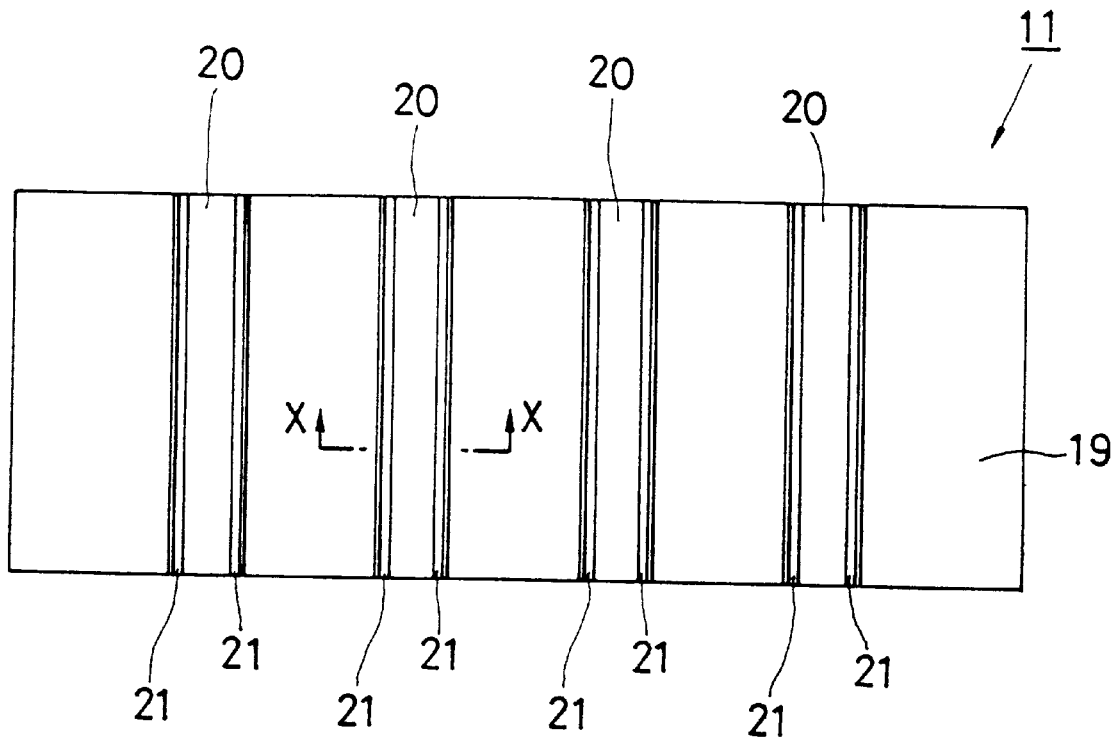
FIG. 2 is a plan view of an essential part of the first example of the pneumatic radial tire shown in FIG. 1.
Figure 3:
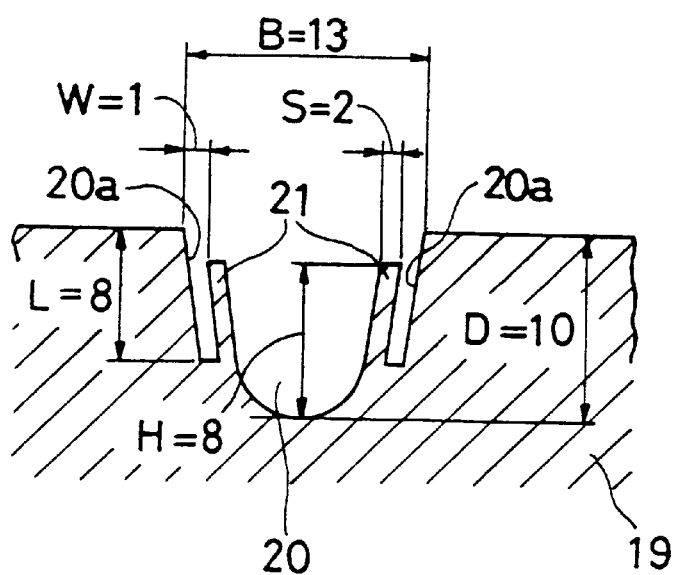
FIG. 3 is a sectional view of the first example of the pneumatic radial tire across line 3—3 in FIG. 2.
Figure 4A:
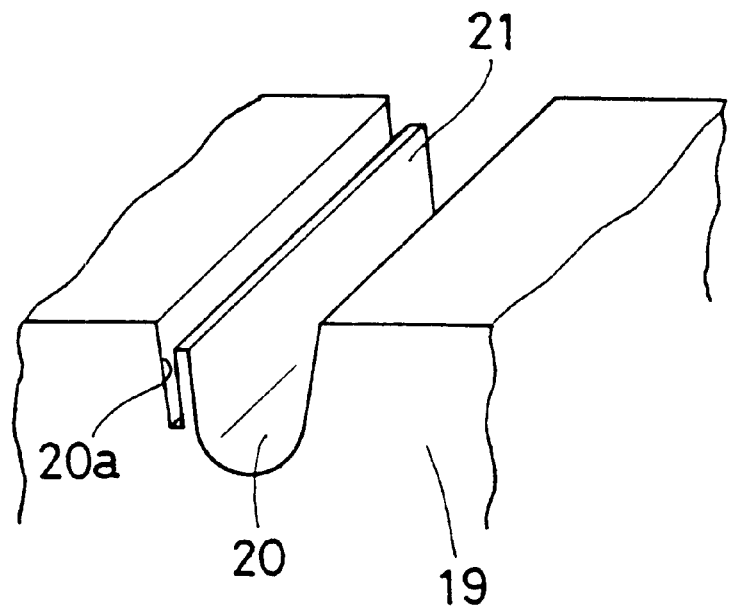
FIGS. 4(A) and (B) illustrate a perspective view of a circumferentially extending groove of a second example of the pneumatic radial tire of the present invention.
Figure 4B:
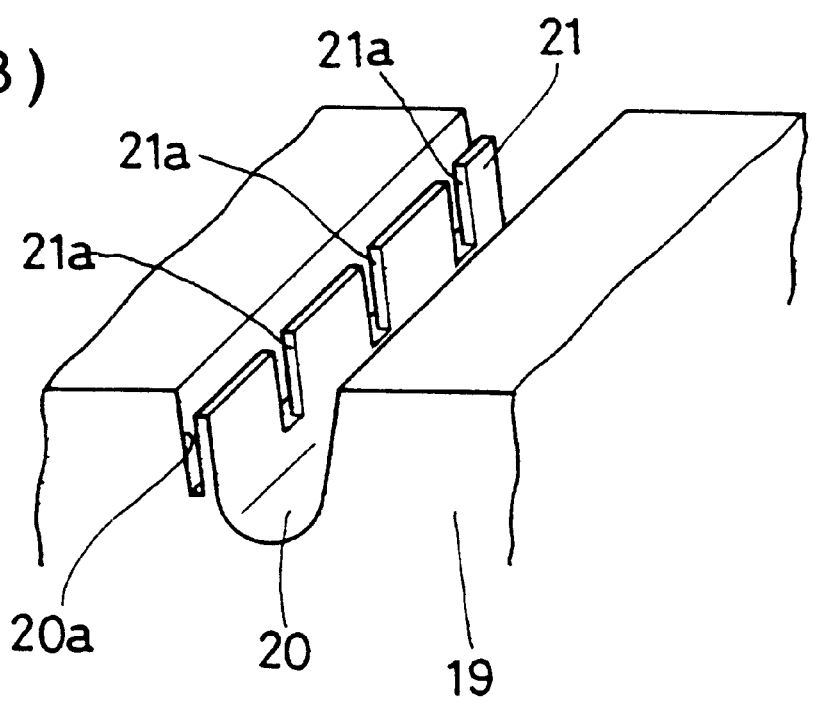

FIG. 1(A) and FIG. 1(B) are sectional perspective views of a first example of the pneumatic radial tire of the present invention. FIG. 2 is a plan view of an essential part of the first example of the pneumatic radial tire FIG. 3 is a sectional view of the first example of the pneumatic radial tire across line 3—3 in FIG. 2. FIGS. 4(A) and 4(B) are perspective views of a circumferentially extending groove of a second example as a modification of the first example of the pneumatic radial tire.

Figure 1:
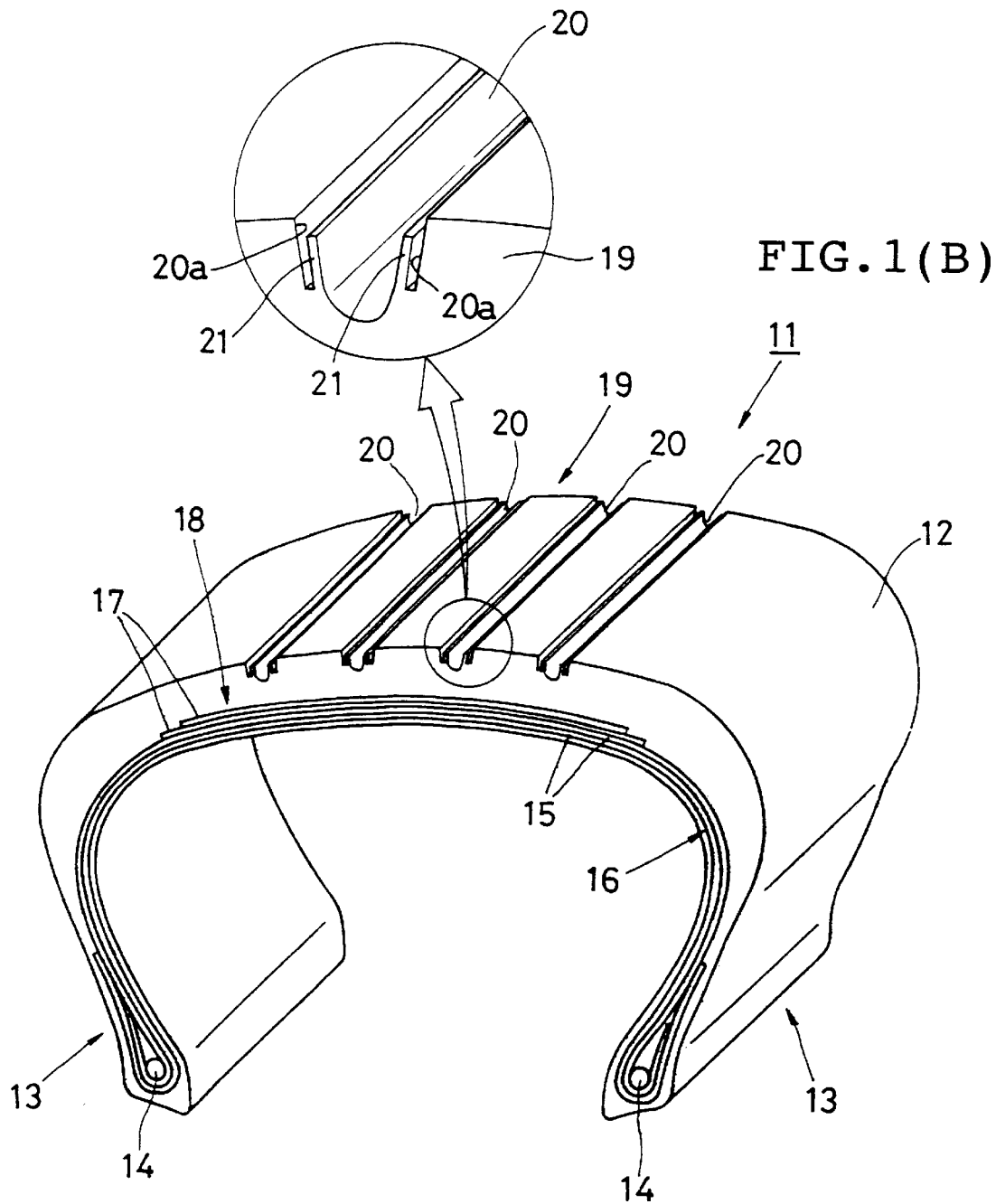
FIGS. 1(A) and 1(B) are a perspective sectional view enlarged and an overall perspective view of a first example of the pneumatic radial tire of the present invention.

In the pneumatic radial tire 11 in FIG. 1, the tire size is PSR265/70R16 and the tire has a toroid shape in section and is made of rubber material 12 as a whole. The bead portions 13 at the sectional terminals of the radial tire 11 are provided with a pair of bead cores 14, 14 formed into a ring around the rotating shaft of radial tire 11. A 2-ply radial carcass layer 16, comprising ply cord 15 is arranged as illustrated in the sectional direction of radial tire 11. It is wrapped around the bead cores 14, 14 from the inside to the outside.

Radially outside of the carcass layer 16 is 2-ply steel belt layer 18 comprising a substantially nonstretchable steel cord 17, and the thick tread 19 formed on the outside of steel belt layer 18 in the radial direction, to cover the steel belt layer 18. Further, the surface of the tread 19 is provided at predetermined intervals with a plurality of continuous rib grooves 20 (circumferentially extending grooves) circumferentially extending around the radial tire 11 in the crosswise direction of the radial tire.

The rib grooves 20 are provided inside with a pair of wall-thin vibration buffer walls 21 having a substantially uniform cross-sectional shape and being essentially parallel to and adjacent to sidewalls 20a respectively. The height of the outside edge of this vibration buffer wall 21 in the radial direction is set lower than the height of the outside edge (surface of the tread 19) of the rib groove 20 in the radial direction of the tire. In this case, the width (B) of rib groove 20 is 13 mm, the depth (D) of rib groove 20 is 10 mm, the height (H) of vibration buffer wall 21 from the bottom of rib groove 20 is 8 mm, the width (S) of vibration buffer wall 21 is 2 mm, the distance (W) between the sidewall 20a of rib groove 20 and the vibration buffer wall 21 is 1 mm, and the depth (L) of the groove between the rib groove 20 and the vibration buffer wall 21 is 8 mm.

The rib groove 20 in the second example in FIG. 4 has a different structure from the rib groove in the first example of the pneumatic radial tire in FIG. 1. That is, in FIG. 4 (A), the vibration buffer wall 21 is essentially parallel to and adjacent to only one of sidewalls 20a of rib groove 20, and in FIG. 4(B), the vibration buffer wall 21 in FIG. 4(A) is provided intermittently with notches 21a. By providing the vibration buffer wall 21 with notches 21a, the extremely thin vibration buffer wall 21 can easily be vulcanized and molded.

The pneumatic radial tire of the present invention was evaluated by comparing it with a conventional pneumatic radial tire as a comparative example. The performance of the first example of the present pneumatic radial tire was compared that the comparative example. The measurement results are shown in Table 1.

TABLE 1

|  | Comparative Example | First Example |
|---|---|---|
| Noise level (overall value) | 0 dB (A) | Δ0.5 dB(A) (Small value is good) |
| Hydroplaning performance | 100 | 99 (Large value is good) |
| Partial wear | 100 | 95 (Small value is good) |

These values are relative to those (as 0 dB(A), 100) of the comparative example.

As can be seen from Table 1, the performance of the first example is improved: that is, the noise level is reduced, the hydroplaning performance is hardly reduced, and the wear resistance of the tire is decreased. This may be because the vibration buffer wall 21 undergoes relatively significant wear in the circumferential direction upon contact with the ground, by which wear on other portions is relatively decreased. In this measurement, the noise level was evaluated with an on-bench noise meter drum. To evaluate drainage, a car ran straight on a pool of 10 mm in depth and the lowest speed when hydroplaning occurred was determined and evaluated. The partial wear was evaluated by examining wear with a machine for measurement of on-bench contact pressure and sliding.

Figure 5:
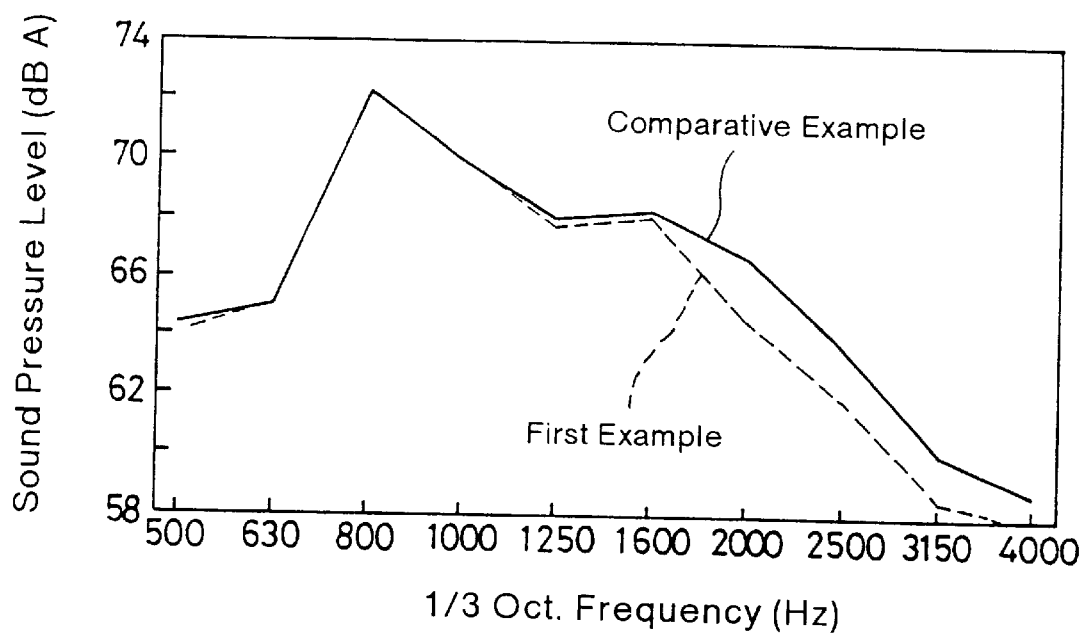
FIG. 5 illustrate a characteristic sound-pressure level against frequency, of rib grooves in rolling tires.
Figure 6A:
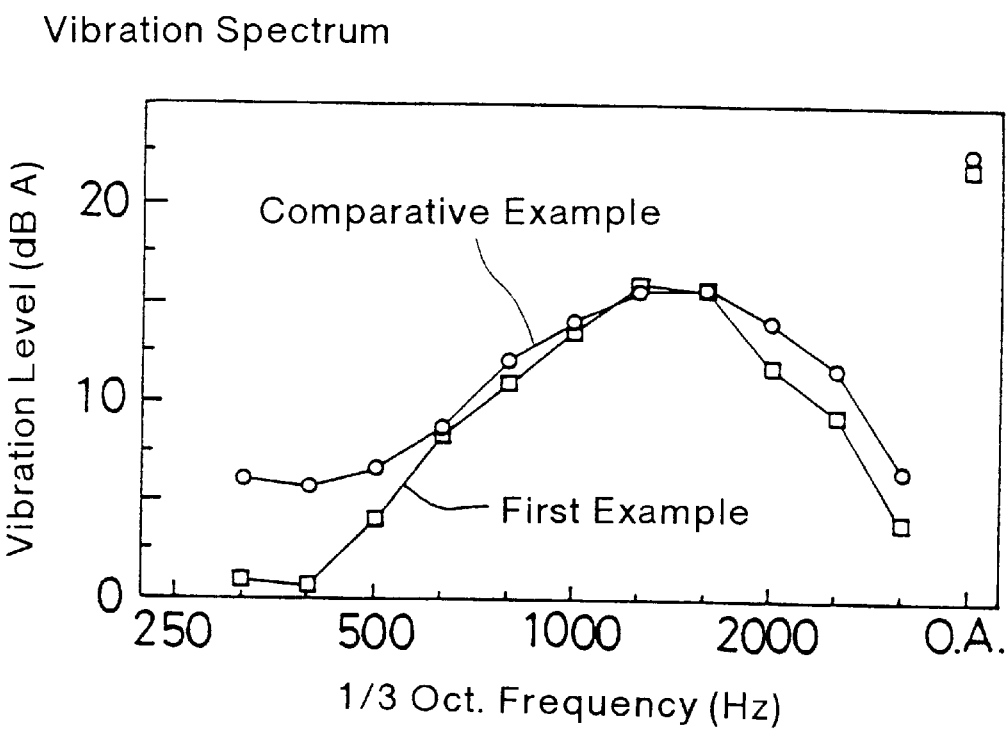
FIGS. 6(A) and (B) illustrate characteristic vibration levels of rib grooves in rolling tires in low- and high-frequency ranges, respectively.
Figure 6B:
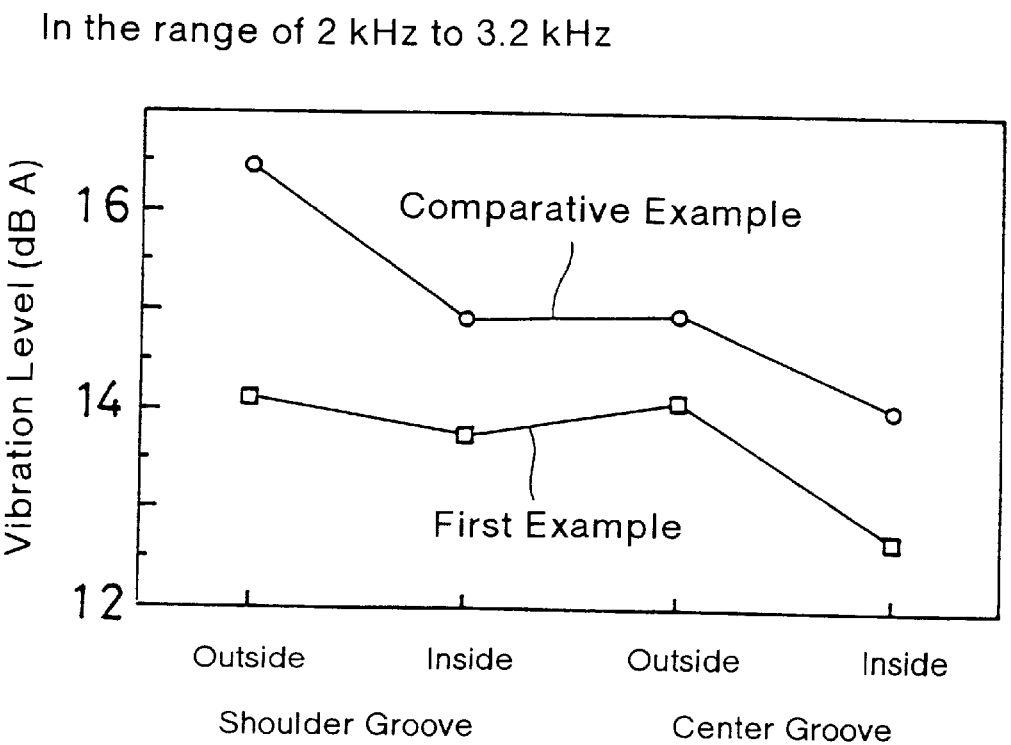

Among the air-column-tube resonance sounds in the rib groove 20, sounds of 1 kHz or thereabout occur due to the vibration of the bottom of the groove, while high-frequency sounds of 2 kHz or more occur due to the vibration of the groove walls. The first example of the present invention has effectively reduced high-frequency resonance sounds because the vibration level in the first example is lower by 1.5 to 2.0 dB (A) in each point ranging from 2 to 3.2 kHz than that of the comparative example, as shown in the characteristics of sound pressure level vs. frequency in FIG. 5 and the characteristics of vibration level vs. frequency in FIG. 6 with respect to the circumferentially extending grooves in the rolling tire. In this measurement of vibration level, an acceleration sensor was attached to the rib groove wall in the comparative example and to the vibration buffer wall 21 in the first example of the present invention.

The pneumatic radial tire of the present invention is further described by reference to third and fifth examples.

Figure 8A:
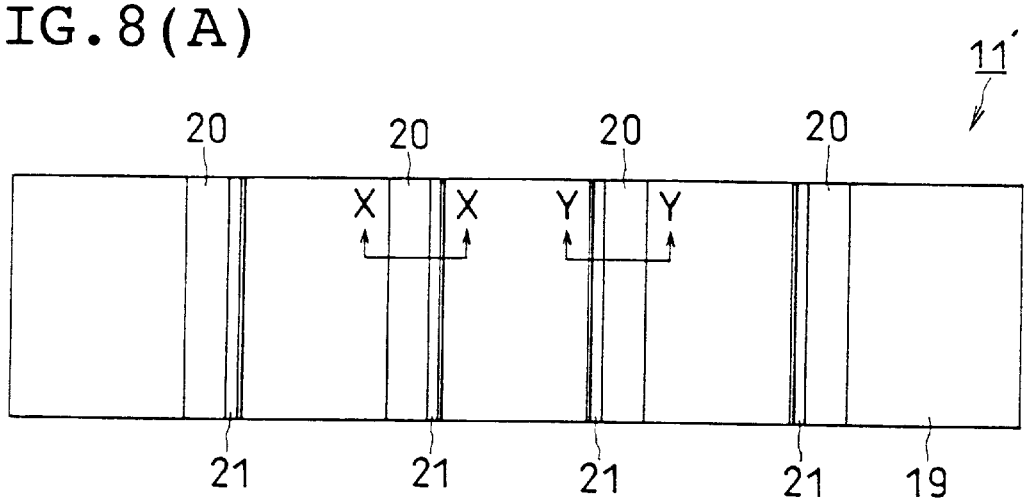
FIGS. 8(A), (B), and (c) illustrate a plan view of an essential part of the third example of the pneumatic radial tire of the present invention and its sectional views across lines X—X and Y—Y, respectively.
Figure 8B:
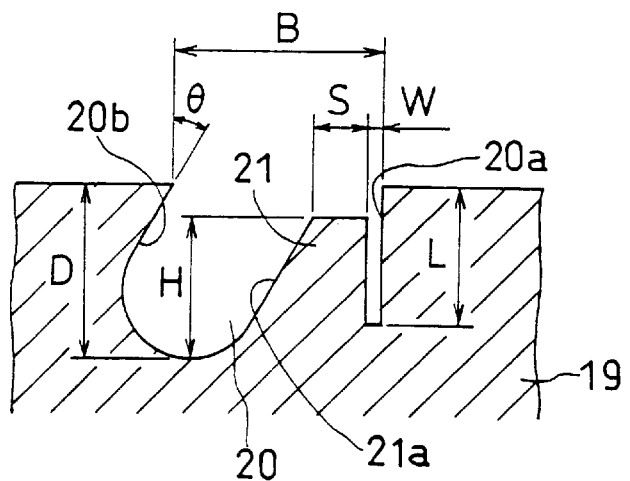
Figure 8C:
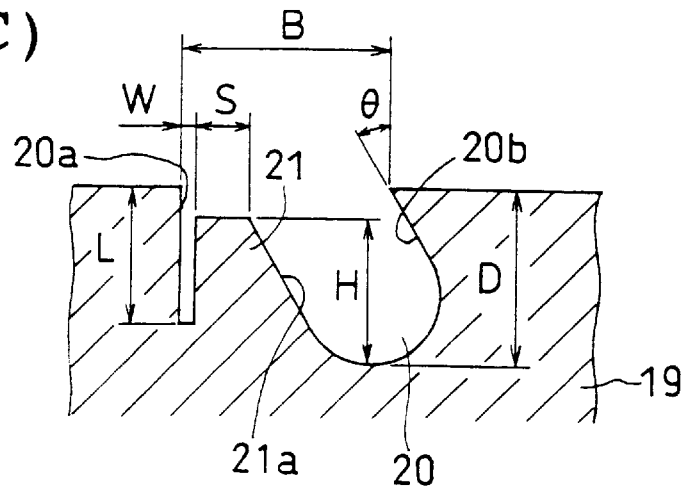
Figure 9A:
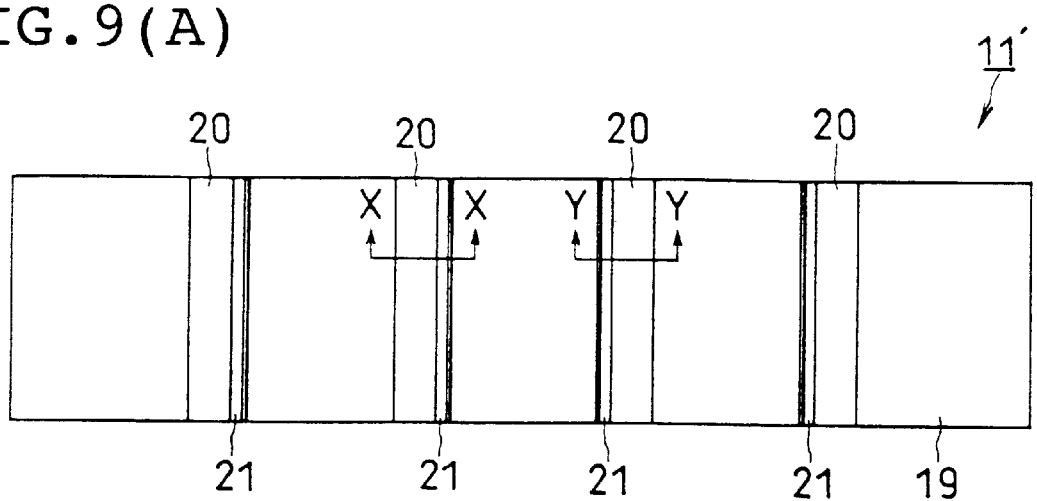
FIGS. 9(A), (B), and (C) illustrate a plan view of an essential part of a fourth example of the pneumatic radial tire of the present invention and its sectional views across lines X—X and Y—Y, respectively.
Figure 9B:
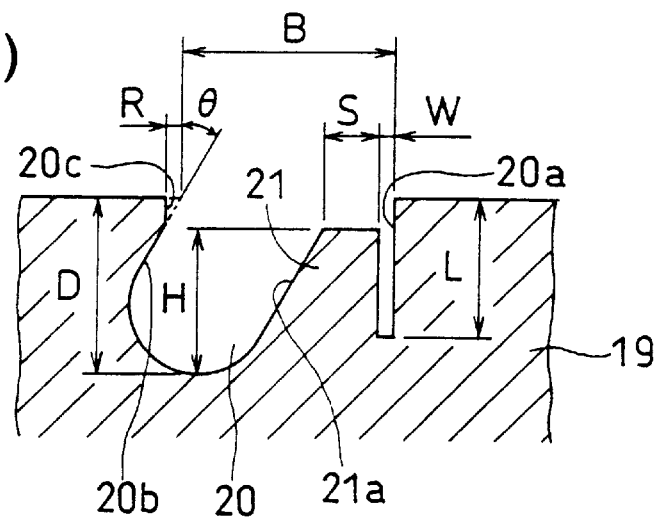
Figure 9C:
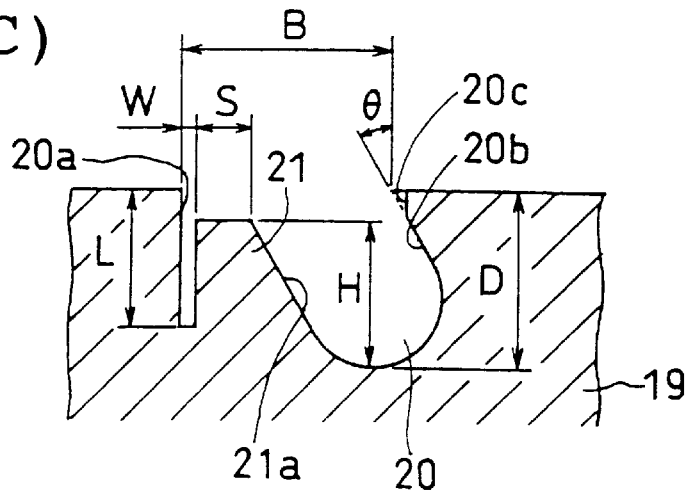
Figure 10A:
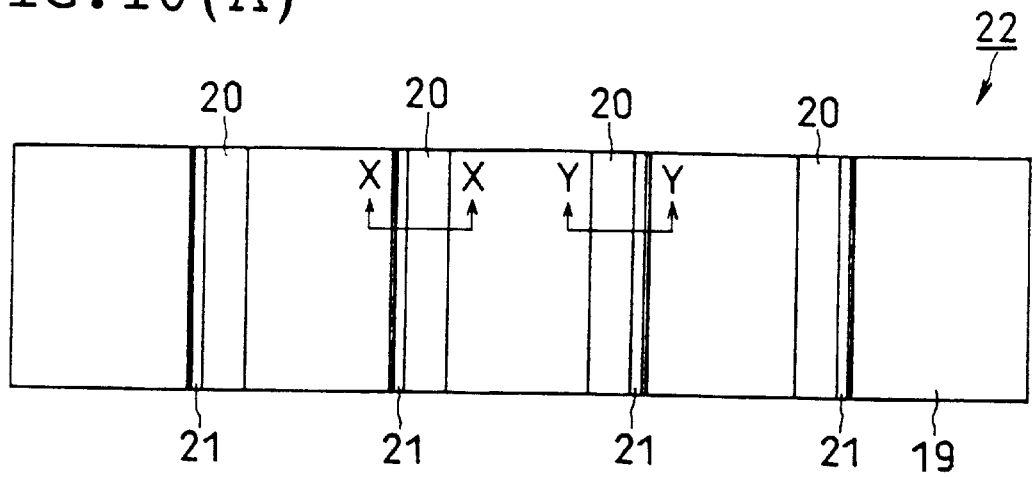
FIGS. 10(A), (B), and (c) illustrate a plan view of an essential part of a fifth example of the pneumatic radial tire of the present invention and its sectional views across lines X—X and Y—Y, respectively.
Figure 10B:
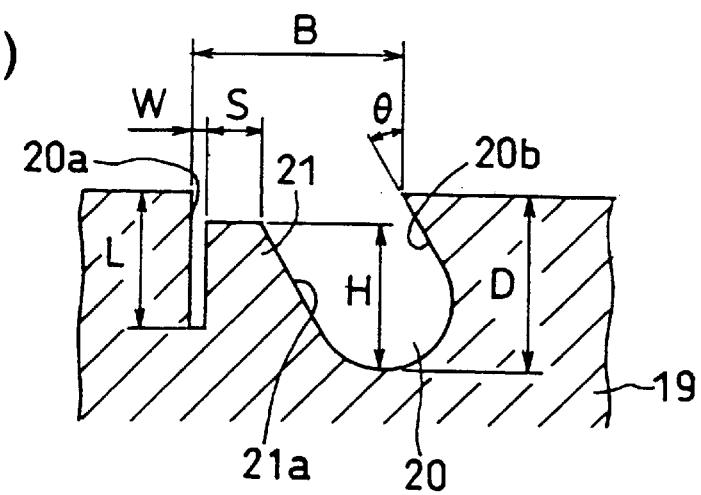
Figure 10C:
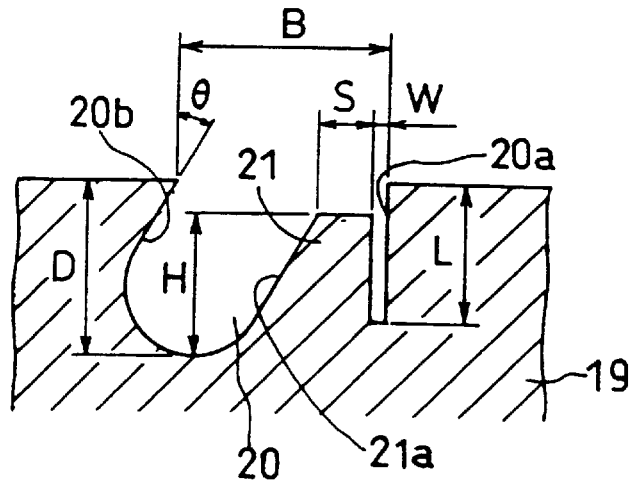

FIG. 7 is a sectional perspective view of a third example of the pneumatic radial tire of the present invention; FIGS. 8(A), (B) and (C) illustrate a plan view of an essential portion of the third example of the pneumatic radial tire and sectional views of its circumferentially extending groove (referred to hereinafter as rib groove), respectively. FIGS. 9(A), (B) and (C) illustrate a plan view of an essential part of a fourth example of the pneumatic radial tire of the present invention and sectional views of its rib groove, respectively. FIGS. 10(A), (B) and (C) illustrate a plan view of an essential part of a fifth example of the pneumatic radial tire of the present invention and sectional views of its rib groove, respectively.

Because the pneumatic radial tire 11' in FIG. 7 is the same as the first example shown in FIG. 1 except for the tire size of TBR265/60R22.5 and the structure of rib groove 20, the description of portions with the same constitution will be omitted.

A plurality of rib grooves 20 continuously extending in the circumferential direction of the radial tire 11' are provided on the surface of tread 19 at predetermined intervals in the crosswise direction of the radial tire 11'.

A vibration buffer wall 21 having an essentially uniform cross-sectional shape is formed within a plurality of rib grooves 20 such that it is essentially parallel to and adjacent to sidewall 20a which is one of the sidewalls of the rib groove 20, and the height of the outside edge of the vibration buffer wall 21 in the radial direction is set lower than the height of the outside edge (surface of the tread 19) of the rib groove 20 in the radial direction of the tire. Further, another sidewall 20b of rib groove 20 and the sidewall 21a facing the inside of the rib groove 20 of the vibration buffer wall 21 are formed such that their upper edges incline at an angle of 20° to 45° to a normal line perpendicular to the tread face and in the direction toward the equatorial plane of the tire. The upper end of another sidewall 20b of the rib groove 20 is formed at an acute angle.

In this case, the width (B) of rib groove 20 is 12 mm, the depth (D) of rib groove 20 is 10 mm, the angle of inclination (θ) of the sidewall 20b of rib groove 20 and the sidewall 21a of vibration buffer wall 21 is 30°, the height (H) of vibration buffer wall 21 from the bottom of rib groove 20 is 8 mm, the width (S) of the upper end of vibration buffer wall 21 is 2 mm, the distance (W) between the sidewall 20a of rib groove 20 and the vibration buffer wall 21 is 1 mm, and the depth (L) of the groove between the rib groove 20 and the vibration buffer wall 21 is 8 mm (see FIGS. 8(A), (B) and (C)).

In the pneumatic radial tire 11' as the fourth example in FIG. 9(A), (B) and (C), the upper end of the sidewall 20b is chamfered in order to improve the durability of the sidewall 20b of rib groove 20 and to facilitate the production of rib groove 20. In this case, the width (R) of the chamfered part 20c is 2 mm.

In the pneumatic radial tire 22 in FIGS. 10(A), (B) and (C), the sidewall 20b of rib groove 20 and the sidewall 21a of vibration buffer wall 21 incline at an angle of 20° to 45° to a normal line perpendicular to the tread face, and their upper edges incline toward the opposite side of the equatorial plane of the tire.

The present pneumatic radial tire was evaluated by comparing it with the conventional pneumatic radial tire. The performance of the third to fifth examples of the present pneumatic radial tire was compared with the conventional one. The measurement results are shown in Table 2.

TABLE 2

| | Comparative Example | 3rd Ex. | 4th Ex. | 5th Ex. |
| --- | --- | --- | --- | --- |
| Noise level (overall value) | 0 dB (A) | Δ1.1 | Δ0.9 | Δ0.7 |
| Noise level (800 to 1 KHz value) | 0 dB (A) | Δ1.6 | Δ1.4 | Δ1.3 |
| Hydroplaning performance | 100 | 101 | 100 | 98 |
| Partial wear | 100 | 93 | 93 | 90 |

In the table, the third example is formed such that, as shown in FIGS. 8(A), (B) and (C), the sidewall 21b of rib groove 20 and the sidewall 21a of vibration buffer wall 21 incline at an angle of 20° to 45° to a normal line perpendicular to the tread face, to form their upper edges as slopes declining toward the equatorial plane of the tire, and the upper end of the sidewall 20b is not chamfered. The fourth example is formed such that, as shown in FIG. 9(A), (B) and (C), the sidewalls 20b and 21a incline at an angle of 20° to 45° to a normal line perpendicular to the tread face, to form their upper edges as slopes declining toward the equatorial plane of the tire, and the upper end of the sidewall 20b is chamfered. The fifth example is formed such that, as shown in FIGS. 10(A), (B) and (C), the sidewalls 20b and 21a incline at an angle of 20° to 45° to a normal line perpendicular to the tread face, to form their upper edges as slopes declining toward the opposite side of the equatorial plane of the tire, and the upper end of the sidewall 20b is not chamfered.

The measurement values for the third to fifth examples are index values relative to those (as 0 dB (A), 100) of the comparative example, where a smaller value is good for noise level and partial wear and a higher value is good for hydroplaning performance.

As can be seen from Table 2, the noise level is decreased and the hydroplaning performance is hardly reduced in the third to fifth examples. The partial wear, as determined in term of wear work done on the part of tread which is most susceptible to wear due to its contact with the ground, shows less partial wear in third to fifth examples, indicating that their resistance to partial wear is improved. This may be because the vibration buffer wall 21 undergoes relatively considerable wear in the circumferential direction upon contact with the ground, by which wear on other portions is relatively decreased.

Figure 11:
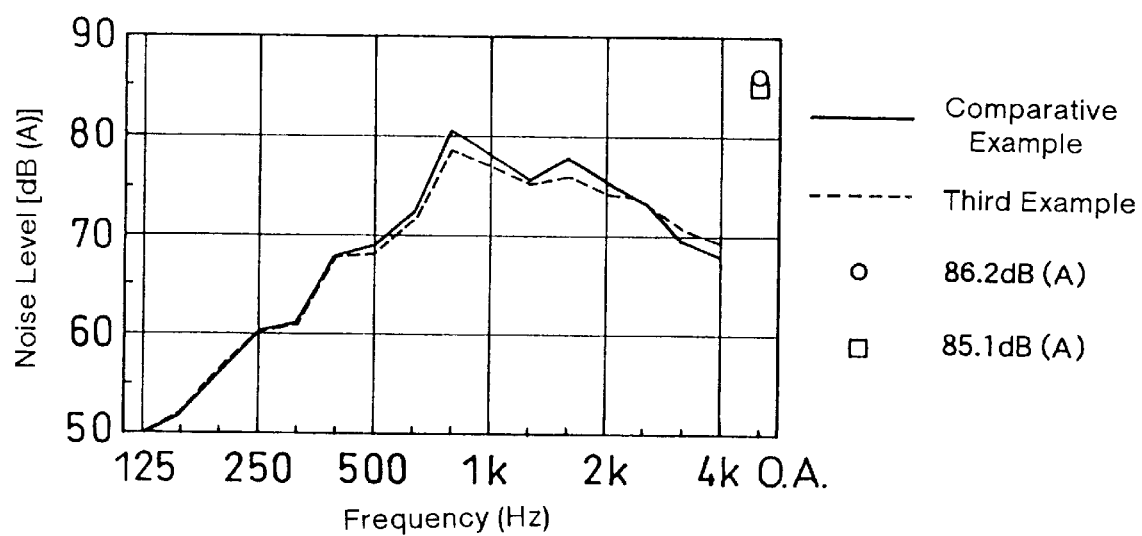
FIG. 11 illustrates a characteristic sound-pressure level against frequency, of rib grooves in rolling tires.

FIG. 11 (characteristics of noise level of rib grooves vs. frequency in the rolling tire) illustrates an on-bench noise spectrum of the third example. As can be seen in this graph, the third example demonstrates a lower noise level in the frequency range of 500 Hz to 2 KHz. The reduction in noise in this range may be attributable to the incline of the sidewall 20b of the rib groove 20 for the noises of 500 Hz to 1.25 KHz and to the provision of the vibration buffer wall 21 for the noises of 1.25 KHz to 2 KHz.

The noise level was evaluated using an on-bench noise meter drum, and the drainage was evaluated by determining the lowest speed at which hydroplaning occurs in a car running straight on a pool of 10 mm in depth. The partial wear was evaluated by examining wear work with a machine for measurement of on-bench contact pressure and sliding.

Figure 12A:
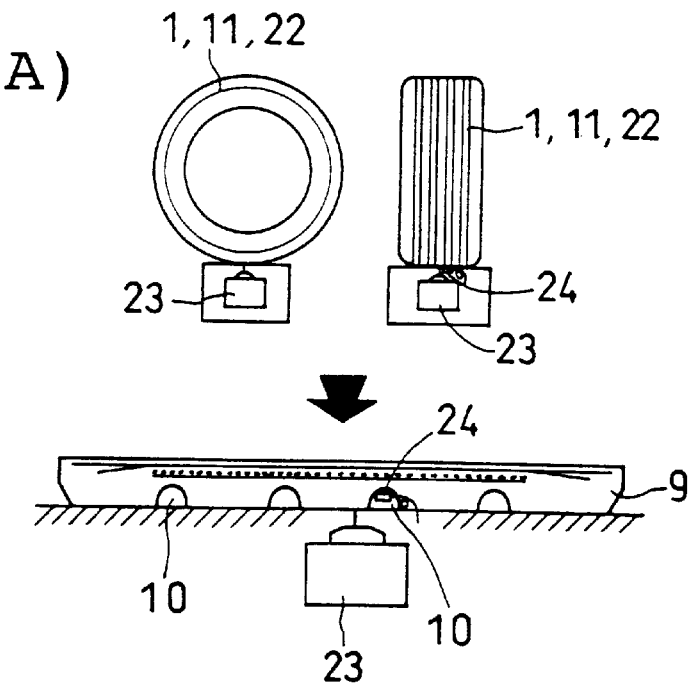
FIGS. 12(A) and (B) illustrate a method of measuring a vibration level at the bottom of rib grooves.
Figure 12B:
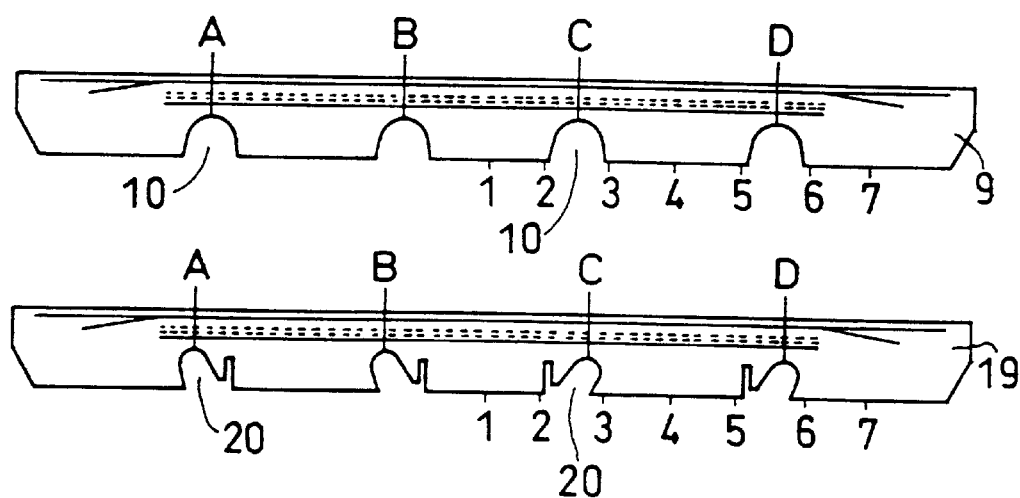
Figure 13A:
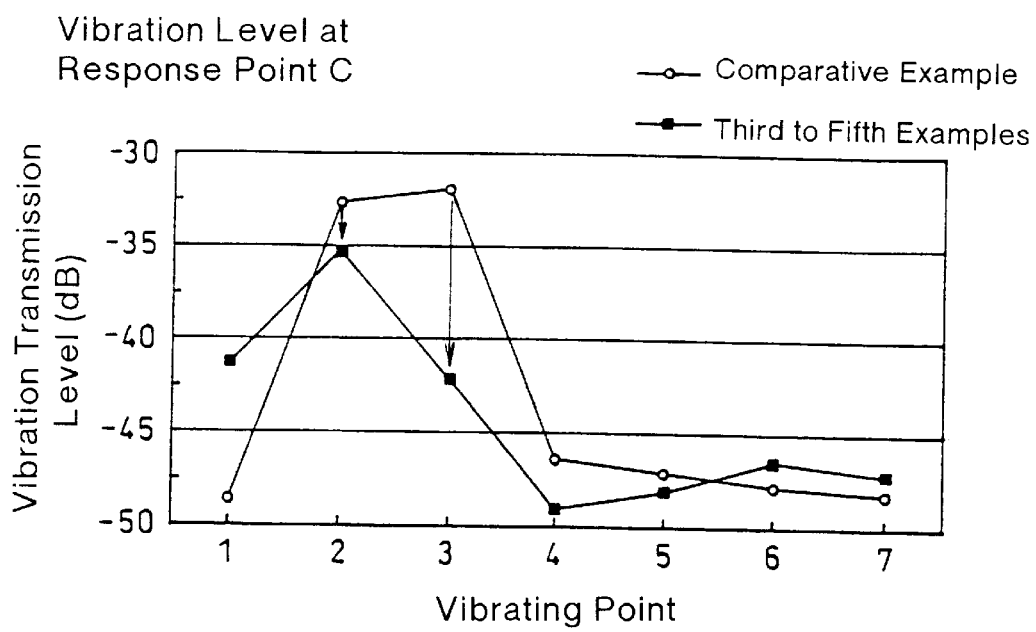
FIGS. 13(A) and (B) illustrate characteristic vibration levels at response points C and D in rib grooves, respectively.
Figure 13B:
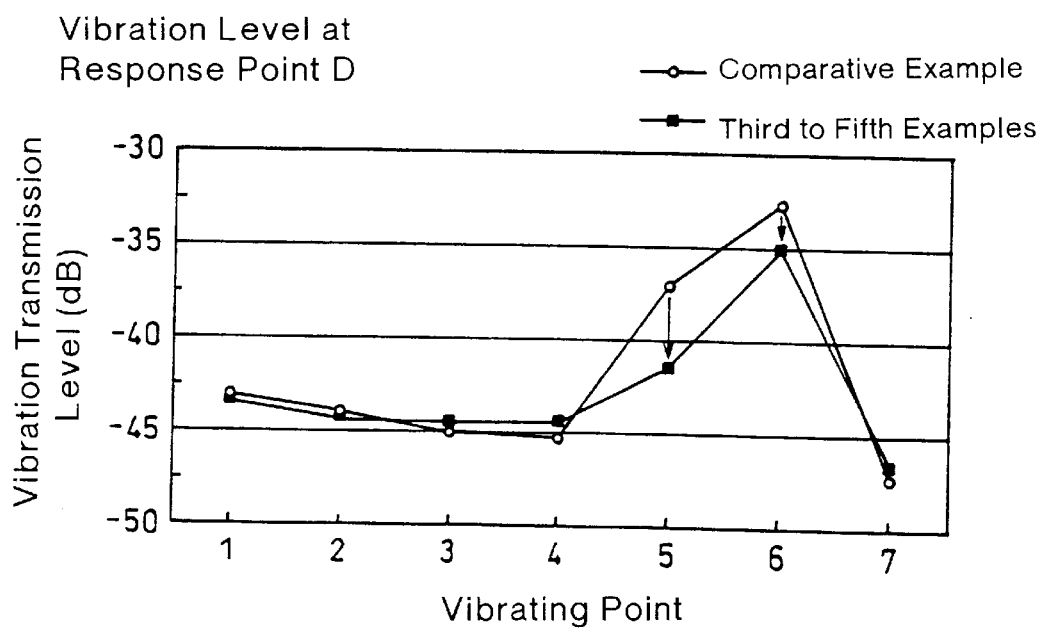

FIGS. 12(A) and (B) illustrate a method of examining the vibration of the groove bottom of rib grooves 10 and 12 caused by vibration on the surface of a road. A vibrating apparatus 23 was used at one position on the ground to vibrate the vibration points 1 to 7 of tread portions 9, 19 in contact with the ground, and the vibration transmission level A/F was measured with an acceleration sensor 24 attached to the response points A to D at the bottom of the rib grooves 10 and 20. The results are shown in FIGS. 13(A) and (B). As can be seen from the graphs, the vibration transmission levels of the response point C to the vibrating points 2 and 3 and of the response point D to the vibrating points 5 and 6 in the third to fifth examples are lower than those of the comparative example, indicating that the vibration at the bottom of the grooves of the rolling tire in contact with the surface of a road is effectively relieved.

Figure 14:
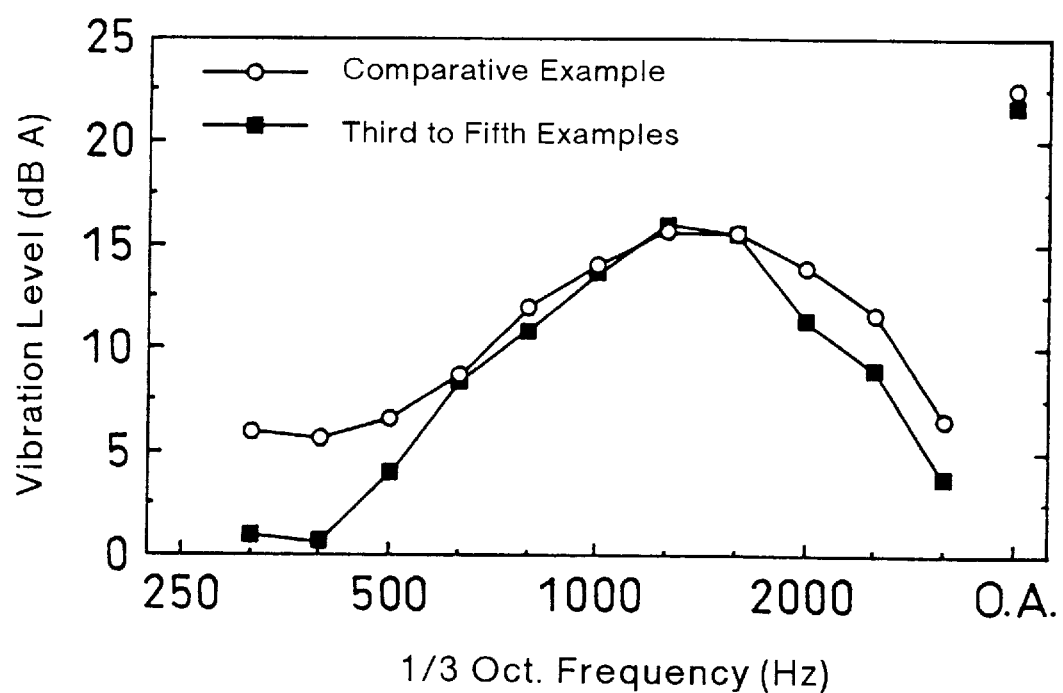

FIG. 14 illustrates the result of the measurement of the vibration of the groove walls of rib grooves 10 and 20 in the rolling tire. The vibration level was measured with the acceleration sensor 24 attached to the walls of rib groove 10 in the comparative example and to the vibration buffer wall 21 in the third to fifth examples. The third to fifth examples illustrate a lower vibration level in the high-frequency range of 2 KHz or more, where the level in the range of 2 KHz to 3.2 KHz is lower by a degree of 1.5 dB (A) to 2.0 dB (A) than in the comparative example. According to the third to fifth examples, vibration in the crosswise direction of the circumferentially extending grooves in the rolling tire is relieved while vibration at the bottom of the circumferentially extending grooves is also relieved as described above, so that air-column-tube resonance sounds of about 800 Hz and high-frequency air-column-tube resonance sounds of 1.6 KHz or more can be lowered. Therefore, the noise of the tire can be reduced.

Although the first to fifth examples have been described above in detail as the embodiments of the pneumatic radial tire of the present invention, the present invention is not limited to the radial tires described in such examples. These can be modified in design without departing from the spirit of the invention described in the appended claims.

For example, a description of the straight and continuously extending straight rib grooves was made for the first example of the present pneumatic radial tire, but the grooves may be zigzag-shaped or partially interrupted.

As can be understood from the above description, the pneumatic radial tire of the present invention can suppress air-column-tube resonance in circumferentially extending grooves to prevent the occurrence of noises because a vibration buffer wall with a roughly identical cross-sectional shape in section is formed near the sidewalls of the circumferentially extending grooves. Hence, the problem of generation of noise from the automobile tires can be prevented.

In addition, the adequate capacity of the circumferentially extending grooves is secured by arranging the vibration buffer wall essentially parallel to the sidewalls of the circumferentially extending grooves, thereby preventing the drainage characteristics from lowering.

Further, the vibration buffer wall itself does not vibrate because the height of the outside edge of the vibration buffer wall is designed to be lower than the height of the outside edge of the circumferentially extending groove. Therefore, noise generation can be effectively prevented, the shear strength in the crosswise direction of the tire in contact with the ground can be reduced, vibration in the crosswise direction of the circumferentially extending grooves in the tire can be relieved, and high-frequency air-column-tube resonance sounds of 1.6 KHz or more can be decreased. The vibration buffer wall with notches are easy to mold, so it is possible to manufacture an extremely thin vibration buffer wall with good workability.

Furthermore, another sidewall of the circumferentially extending groove is inclined at an acute angle of 20° to 45° to a normal line perpendicular to the tread face so that the vibration at the bottom of the circumferentially extending grooves is relieved and air-column-tube resonance sounds of 800 Hz or thereabout can be reduced. Therefore, the problem of generation of noise from the automobile tires can be prevented.

Finally, the upper end of another sidewall of the circumferentially extending groove is chamfered so that the durability of the sidewall can be improved and simultaneously the molding of such sidewall is made easy, leading to the simplification of tire manufacturing.

What is claimed is:

1. A pneumatic radial tire comprising; a radial carcass layer, a pair of bead cores, a belt layer radially outside said carcass and, a tread arranged outside of said belt layer in the radial direction of the tire, a circumferentially extending groove provided on said tread and having sidewalls inclined in opposite directions with respect to a radial direction of said tire, and at least one vibration buffer wall having a substantially constant cross sectional shape with sidewalls inclined with respect to the radial direction of said tire and extending from a bottom portion of said circumferentially extending groove toward a tread surface of said tread, each of said sidewalls of said vibration buffer wall inclined in the same direction as that of an adjacent sidewall of said circumferentially extending groove, wherein the height of the outside edge of the vibration buffer wall in the radial direction of the tire is lower than the height of the outside edge of said circumferentially extending groove in the radial direction of the tire, and $0.50D \leq H \leq 0.95D$, $S \leq 0.30B$, $0.01B \leq W \leq 0.30B$, and $0.50D \leq L \leq 1.50D$, wherein B is a width of said circumferentially extending groove, D is the depth of said circumferentially extending groove, H is the height of said vibration buffer wall from the bottom of said circumferentially extending groove, S is the width of an upper surface of said vibration buffer wall, W is the width of a groove between the sidewall of said circumferentially extending groove and said vibration buffer wall, and L is a depth of the groove between the sidewall of said circumferentially extending groove and said vibration buffer wall, wherein a shear strength in a cross-wise direction of said circumferentially extending groove is reduced to relieve vibration and reduce column-tube resonance sound.

2. The pneumatic radial tire according to claim 1, wherein said vibration buffer wall is formed essentially parallel to both sidewalls of said circumferentially extending groove.

3. The pneumatic radial tire according to claim 1, wherein a second vibration buffer wall is formed adjacent to another sidewall of said circumferentially extending groove.

4. The pneumatic radial tire according to claim 3, wherein said vibration buffer wall and said second vibration buffer wall are formed adjacent and parallel to both the sidewalls of said circumferentially extending groove.

5. The pneumatic radial tire according to claim 4, wherein said vibration buffer walls have notches.

6. The pneumatic radial tire according to claim 3, wherein said vibration buffer walls have notches.

7. The pneumatic radial tire according to claim 3 wherein said vibration buffer wall and said second vibration buffer wall have substantially identical cross-sectional shapes.

8. The pneumatic radial tire according to claim 3 wherein said circumferentially extending groove has a substantially u-shape in cross-section and said vibration buffer wall and said second vibration buffer wall are formed adjacent to and defined by sidewalls of said u-shape circumferentially extending groove.

9. The pneumatic radial tire according to claim 1 wherein said vibration buffer wall has notches.

10. A pneumatic radial tire comprising; a radial carcass layer, a pair of bead cores, a belt layer radially outside said carcass and, a tread arranged outside of said belt layer in the radial direction of the tire, a circumferentially extending groove provided on said tread and having one sidewall and another sidewall, and at least one vibration buffer wall having a width of an upper surface S and said circumferentially extending groove having a width B such that $S \leq 0.30B$ and said at least one vibration buffer wall is formed adjacent to said one sidewall of said circumferentially extending groove, said one sidewall of said circumferentially extending groove being substantially perpendicular to the tread face, wherein the height of the outside edge of the vibration buffer wall in the radial direction of the tire is lower than the height of the outside edge of said circumferentially extending groove in the radial direction of the tire, and said another sidewall of said circumferentially extending groove is inclined at an acute angle to the tread face and at an angle of 20° to 45° to a normal line perpendicular to the tread face, the sidewall of the vibration buffer wall facing the inside of the circumferentially extending groove is inclined with respect to the normal line in the same direction as that of said another sidewall of the circumferentially extending groove, said one vibration buffer wall and said one sidewall of said circumferentially extending groove define a groove having a substantially constant cross sectional shape.

11. The pneumatic radial tire according to claim 10, wherein the sidewall of the at least one vibration buffer wall facing the inside of the circumferentially extending groove is inclined at an angle of 20° to 45° to a normal line perpendicular to the tread face.

12. The pneumatic radial tire according to claim 11, wherein the upper end of said another sidewall of said circumferentially groove is chamfered.

13. The pneumatic radial tire according to claim 10, wherein the upper end of said another sidewall of said circumferentially groove is chamfered.

14. The pneumatic radial tire according to claim 10, wherein the following relationship is satisfied:

$$0.50D \leq H \leq 0.95D$$

$$S \leq 0.30B$$

$$0.01B \leq W \leq 0.30B$$

$$0.50D \leq L \leq 1.50D$$

wherein B is a width of said circumferentially extending groove, D is a depth of said circumferentially extending groove, H is the height of said buffer vibration wall from the bottom of said circumferentially extending groove, S is the width of an upper surface of said buffer vibration wall, W is the width of a groove between the sidewall of said circumferentially extending groove and said vibration buffer wall, and L is the depth of the groove between said circumferentially extending groove and said vibration buffer wall.

15. The pneumatic radial tire according to claim 10, wherein sidewall said buffer wall has a face extending perpendicular to the tread face.

* * * * *